(12) United States Patent
Suzuki et al.

(10) Patent No.: US 8,467,529 B2
(45) Date of Patent: Jun. 18, 2013

(54) CONTENT REPRODUCTION APPARATUS, RECORDING APPARATUS, RECORDING AND REPRODUCTION APPARATUS, AND REPRODUCTION METHOD

(75) Inventors: Takayuki Suzuki, Sagamihara (JP); Mitsunobu Watanabe, Yokohama (JP); Nobuaki Kohinata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 702 days.

(21) Appl. No.: 12/422,371

(22) Filed: Apr. 13, 2009

(65) Prior Publication Data
US 2009/0316891 A1     Dec. 24, 2009

(30) Foreign Application Priority Data
Jun. 19, 2008   (JP) ................................. 2008-159868

(51) Int. Cl.
*H04N 7/167*     (2011.01)
(52) U.S. Cl.
USPC ......................................................... 380/203
(58) Field of Classification Search
USPC ................... 380/201, 203; 713/193
See application file for complete search history.

(56) References Cited

U.S. PATENT DOCUMENTS

| | | | |
|---|---|---|---|
| 2003/0071971 | A1 | 4/2003 | Jo |
| 2007/0133942 | A1 | 6/2007 | Moors et al. |
| 2007/0280641 | A1* | 12/2007 | Uchimura ....................... 386/95 |

FOREIGN PATENT DOCUMENTS

| | | |
|---|---|---|
| CN | 1248768 | 3/2000 |
| CN | 1293516 | 5/2001 |
| CN | 1883206 | 12/2006 |
| EP | 0 989 553 | 3/2000 |
| JP | 2001-024994 | 1/2001 |
| JP | 2003-331509 | 11/2003 |
| JP | 2004206771 A * | 7/2004 |
| JP | 2004-260522 | 9/2004 |
| JP | 2005-236527 | 9/2005 |
| JP | 2007-095204 | 4/2007 |

OTHER PUBLICATIONS

Chinese Office Action for Chinese Application No. 200910133039.X, issued on Jun. 7, 2010.
Japanese Office Action for Japanese Application No. 2008-159868, issued on Apr. 17, 2012.
"Security Architecture for Intelligent Attachment Device Specifications", Recording and Playback Device for iVDR—TV Recording specification (http://www.safia-lb.com/doc/spec/SAFIA_RPD_TV_V120_20080221.pdf).

* cited by examiner

*Primary Examiner* — Samson Lemma
(74) *Attorney, Agent, or Firm* — Antonelli, Terry, Stout & Kraus, LLP.

(57) ABSTRACT

In an apparatus of reproducing contents in which an encryption key is to be changed at predetermined intervals for copyright protection purpose, the contents can be reproduced or specially reproduced with no problem such as fast forward, and fast rewind. For special reproduction, data and key information needed therefor are made ready in advance, and using the data and the key information, the contents are specially reproduced. Alternatively, an encryption key generation rule is defined in advance for use in generation of an encryption key. By making any needed key information ready in advance from this rule, the contents can be reproduced and specially reproduced with no problem.

16 Claims, 14 Drawing Sheets

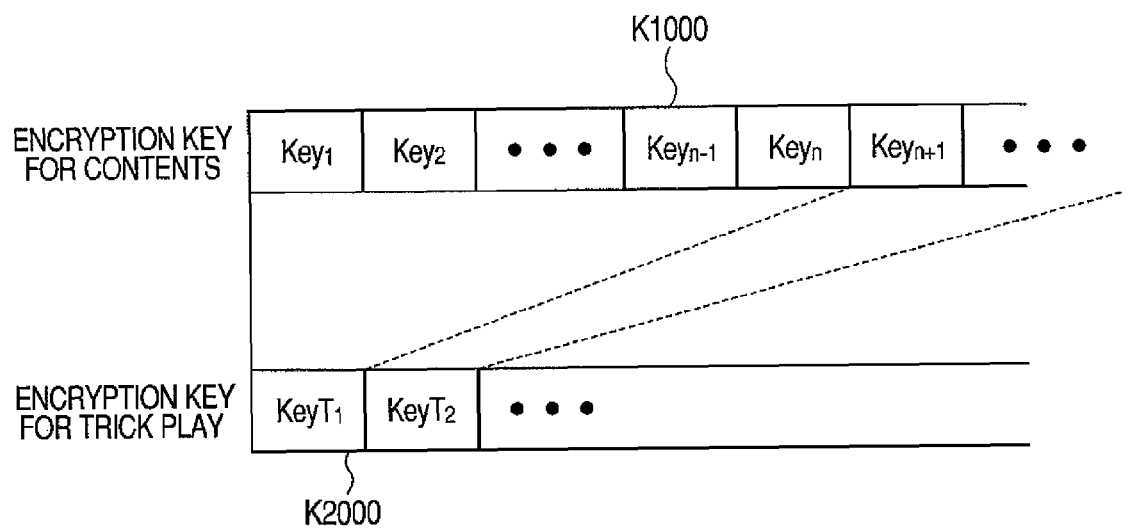
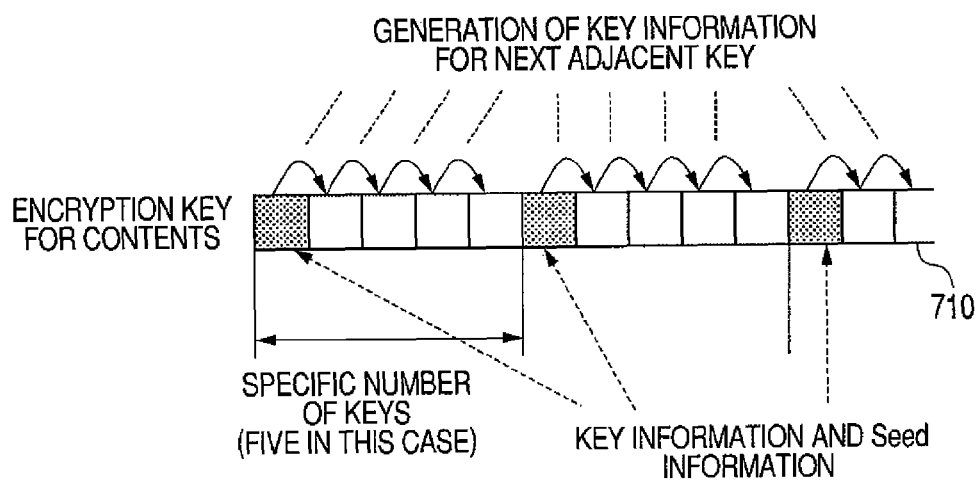

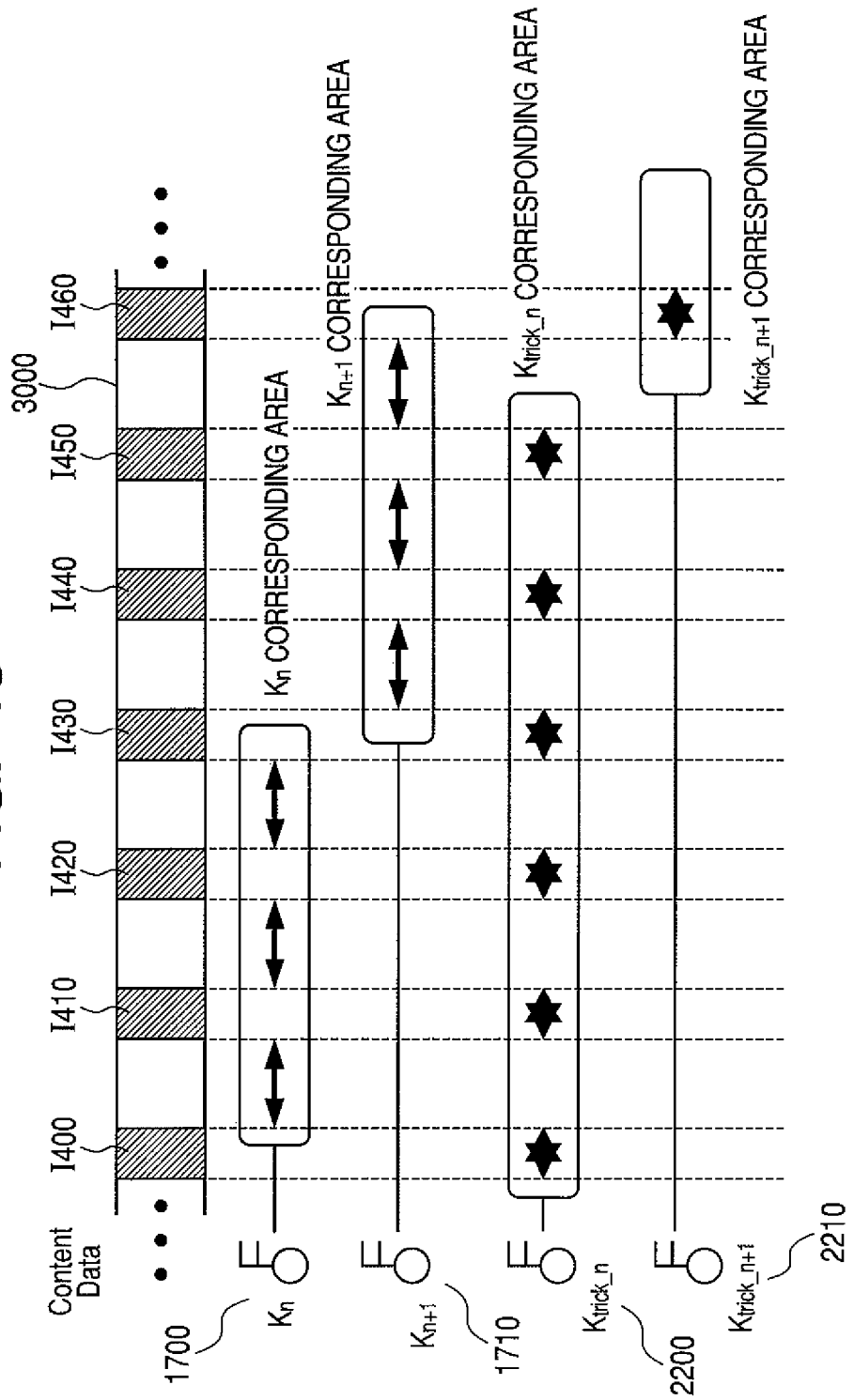

CONTENT REPRODUCTION APPARATUS, RECORDING APPARATUS, RECORDING AND REPRODUCTION APPARATUS, AND REPRODUCTION METHOD

BACKGROUND OF THE INVENTION

The present invention relates to an apparatus and method for recording and reproduction of contents with the use of a removable content storage medium having a high copyright protection function, i.e., high security level.

With recent digital broadcast, in view of copyright protection, contents are provided after being encrypted with the addition of a restricting signal such as "one-time copy only". Accordingly, with a digital-broadcast-ready recorder, contents are stored in a storage medium such as hard disk drive (HDD) after being uniquely encrypted, thereby preventing leakage of contents due to unauthorized use or human error, for example. For writing of contents recorded on an HDD onto a DVD (Digital Versatile Disc) or a Blu-ray Disc™, for example, the contents recorded on the HDD are to be removed (move function), thereby following the predetermined rule of "one-time copy only".

The issue here is that the contents cannot be stored on any removable hard disk as having been uniquely encrypted before storage on the hard disk. Even if the contents can be stored on such a removable hard disk, the resulting disk will not work on any other types of apparatuses, and thus users find it inconvenient. In consideration thereof, a removable hard disk "iVDR Secure™" has appeared on the market with the copyright protection function. This "iVDR Secure" is in conformity with SAFIA (Security Architecture For Intelligent Attachment device) being the copyright protection technology, and includes various functions for implementation of the copyright protection function for the contents. The various functions include the function of managing encrypted content data separately from a Usage Pass being key information including a decoding key for the content data, the function of protecting the Usage Pass in storage from any unauthorized access, and the function of transferring the Usage Pass with PKI (Public Key Infrastructure)-based two-way authentication. Moreover, using such copyright protection function for the contents, specifications are defined for music players mainly for music contents and for video players mainly for video contents. With the video players, a logical block of 3072 bytes being the result of video stream division is referred to as Aligned Unit (AU), and content encryption is performed by the unit of this AU. A logical block being a collection of 512 successive Aus is referred to as Allocation Unit (ALU), and this ALU is the minimum unit for content encryption by one Usage Pass. For implementing the content move function, there needs to change the Usage Pass in a minute or less with the SAFIA because the time allowed for content duplication is a minute or shorter. Examples include Patent Document 1 (JP-A-2007-95204), and Non-Patent Document 1 (Recording and Playback Device for iVDR—TV Recording specification (http://www.safia-lb.com/doc/spec/SAFIA_RPD_TV_V120_20080221.pdf)).

With a recorder using a storage medium being such an SAFIA-conformed "iVDR Secure", contents stored in the "iVDR Secure" are normally reproduced in the following manner, i.e., mutual authentication is performed between the recorder body and the "iVDR Secure", a communications path is established for encryption using a Usage-Pass transfer protocol between the recorder body and the "iVDR Secure", the Usage Pass is read with security, any separately-read encrypted contents are decoded using an encryption key stored in the Usage Pass, and the resulting data is passed to a decoder. With the recorder body and the "iVDR Secure" as such, however, there is a concern that it may take a long time to read the Usage Pass with security because the CPU (Central processing Unit) in use is of a built-in type with the processing capability being not sufficiently high. If this is the case, there is a possibility of causing screen disturbance because reading of the Usage Pass takes too long for normal reproduction. Moreover, when a plurality of vendors provide their own "iVDR Secure", for example, the time needed to read the Usage Pass with security may possibly vary among the vendors. For implementing special reproduction such as fast forward or fast rewind, there needs to read the Usage Pass and the contents at a speed corresponding to the fast speed. The contents made for digital broadcast are referred to as MPEG2 (Motion Picture Experts Group 2) TS (Transport Stream), and for special reproduction thereof, there are at least needs to display a plurality (n) of frames (I frames) in a minute, and to make a frame selection at predetermined time intervals for display, e.g., if with an X-speed, y frame (s) in x minutes are selected at intervals of y/n so as to display the x-minute-after frame after a minute. Such an operation is required to be executed at the same time as reading of the Usage Pass that is completed in less than a minute. As such, implementing special reproduction will be difficult when reading of the Usage Pass takes a long time.

SUMMARY OF THE INVENTION

With an apparatus provided with a copyright protection function such as SAFIA, the processing of reading key information from a storage medium with security is performed by a CPU provided in the storage medium. Accordingly, if it takes time to acquire the key information, information decoding may not be completed in time before display of the contents, and thus the video in progress of being reproduced may be stopped. When the acquiring time is a second or so, for example, this may cause no problem for normal reproduction, but for special reproduction, the need arises for acquiring and decoding the key information located at the position of the contents including any selected I frame. This is because the key information needed for decoding does not always have a one-to-one relationship with the contents, and is changed at predetermined intervals. As such, acquiring not only the reproducing contents but also the key information therefor results in a long processing time for such acquisition. This causes a problem of not being able to perform smoothly reproduction or special reproduction because the processing cannot be completed in time before display of the contents.

In order to solve the problems described above, data for use during special reproduction is stored in advance in a separate file, and this data is used during special reproduction so that reproduction processing is implemented. This trick play information is stored in an "iVDR Secure" after being encrypted so that contents of a copyright holder can be accordingly protected. As such, even if the encryption key information is to be changed at predetermined intervals, separately storing the data for use with special reproduction as such will allow correlation establishment between one encryption key and a wider range of data compared with normal reproduction in terms of reproduction time.

Alternatively, in order to solve the problems described above, key information for trick play data is correlated with key information for use with normal reproduction, thereby eliminating the time to be taken to acquire an encryption key.

For reproduction of encrypted contents with a change of key information at predetermined intervals, and for special reproduction such as fast forward and fast rewind, the invention enables smooth implementation thereof.

These and other features, objects and advantages of the present invention will become more apparent from the following description when taken in conjunction with the accompanying drawings.

BRIEF DESCRIPTION OF THE DRAWINGS

FIG. 13 is a diagram showing the correlation between content key information and special reproduction key information in the embodiment of the invention;

FIG. 14 shows an exemplary encryption key generation rule in the embodiment of the invention; and FIG. 15 shows an exemplary encryption key correlation method in the embodiment of the invention.

DESCRIPTION OF THE EMBODIMENTS

In the below, embodiments of the invention are described by referring to the accompanying drawings. Note that exemplified in the embodiments is a case of using the SAFIA for content protection with a change of key information at predetermined intervals. This SAFIA is surely not the only option, and the invention is applicable to any other similar content protection technologies.

First Embodiment

Figure 1:
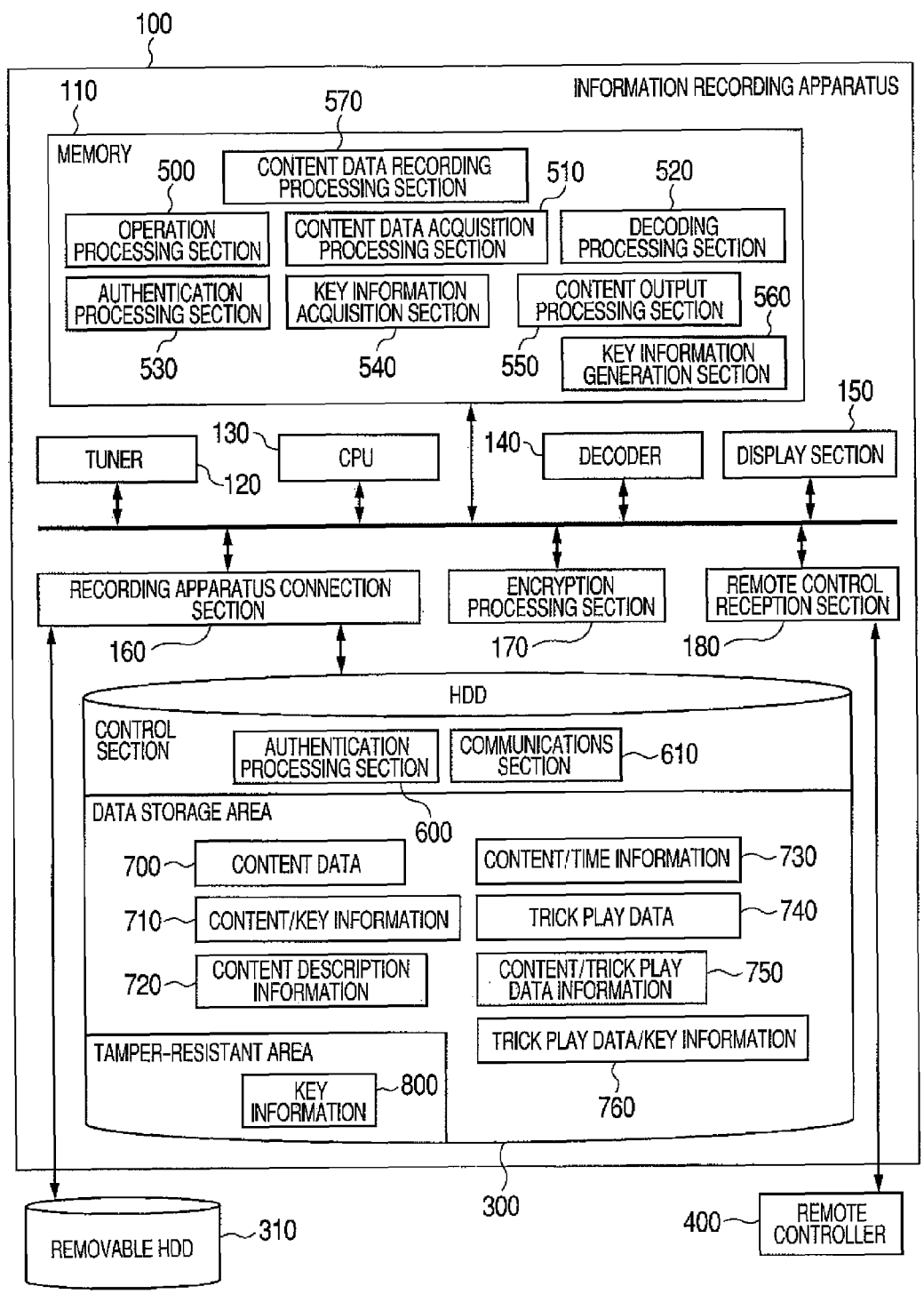
FIG. 1 is a diagram showing the configuration of hardware and that of software in an embodiment of the invention.

FIG. 1 is a diagram showing the hardware/software configuration of a recorder in an embodiment being compatible with a removable hard disk, e.g., "iVDR Secure", and having the copyright protection function for implementation of the invention. The recorder may be provided in a television receiver, or in a PC (Personal Computer) or a DVD recorder. In this sense, in this embodiment, any recorder being compatible with the "iVDR Secure" is referred to as information processor, and any hard disk for recording and storage of contents, e.g., removable hard disk ("iVDR Secure") and normal hard disk, is referred to as information recording apparatus.

An information processor 100 is configured to include, as software components, a content data acquisition section 510, a decoding processing section 520, a key information acquisition section 540, an authentication processing section 530, an operation processing section 500, a content output processing section 550, a key information generation section 560, and a content data recording processing section 570. The content data acquisition section 510 serves to read any encrypted contents, and the decoding processing section 520 serves to decode the contents. The key information acquisition section 540 is provided for acquiring key information for temporary storage and use. The authentication processing section 530 is provided for authentication between the information processor 100 and information recording apparatuses 300 and 310 for keeping the security level high. The operation processing section 500 serves to accept user requests, and the content output processing section 550 serves to actually output content data to an output device 140, e.g., decoder. The key information generation section 560 serves to generate key information, and the content data recording processing section 570 serves to record the contents on the information recording apparatuses 300 and 310. As hardware components, the information processor 100 is configured to include, in addition to a CPU 130 in charge of software processing, a tuner 120, a decoder 140, a display section 150, a recording apparatus connection section 160, an encryption processing section 170, a remote control reception section 180, and others. The tuner 120 is provided for acquisition of recording information, and the decoder 140 is provided for outputting any acquired and recorded data as video and audio signals. The display section 150 corresponds to a speaker and the panel portion of a television, where the video and audio signals coming from the decoder are actually represented. The recording apparatus connection section 160 is provided for connection of an HDD being an information recording apparatus. The encryption processing section 170 is provided for assistance of encryption and decoding processing. The remote control reception section 180 is provided for accepting any user operation. The information processor in this embodiment includes the display section, and is integral with the television. This is surely not restrictive, and the information processor is not necessarily integral with the television. If this is the configuration, the display section 150 is replaced with an external output section (not shown) for outputting the video and audio signals to the outside of the information processor.

The information recording apparatuses 300 and 310 are similar in configuration, and are each divided mainly into three portions, i.e., a control section, a data storage section, and a tamper-resistant area. The control section is a portion for controlling the information recording apparatuses 300 and 310, and includes a communications section 610 and an authentication processing section 600. The communications section 610 is in charge of data exchange, and the authentication processing section 600 is provided for implementation of the high security level such as in the "iVDR Secure". Information for recording is stored in the data storage section, and the data storage section carries therein various types of data and information, e.g., encrypted content data 700, content description information 720 about the contents, content/time information 730 about the correlation between the contents and time, and content/key information 710 for use to acquire key information needed for decoding of the contents. The data storage section also carries therein other types of information, i.e., special reproduction data 740 for use during trick play such as fast forward and fast rewind (hereinafter, referred to as special reproduction), content/special reproduction data information 750 about the correlation between the special reproduction data and the contents, and special reproduction data/key information 760 for acquisition of a key used for encryption of the special reproduction data. Herein, the information recording apparatuses 300 and 310 each store therein also key information 800 but specifically in the tamper-resistant area. This is because the key information is important, and is not supposed to be easily acquired and changed. Even if such a tamper-resistant area is not provided as a normal HDD, any contents with no need for encryption, i.e., copy-free contents, or any contents with its own unique encryption may be stored in the data storage area for use with no concern for the key information.

If with an "iVDR Secure", for example, the key information of Usage Pass is stored in the tamper-resistant area provided inside of the information recording apparatus, and is corresponding to the key information 800 of FIG. 1. For preventing easy access to the tamper-resistant area, authentication has to be performed between the information processor 100 and the information recording apparatus 300 or 310 for extraction of the key information through access to this area. Information exchange is performed after a secure communications path is reserved. This mechanism favorably enhances the security level of the contents in storage.

With an HDD such as "iVDR Secure", the communications section for use between the information processor 100 and the information recording apparatus 300 is generally an ATA (Advanced Technology Attachment) interface and an SCSI (Small Computer System Interface) interface, but these are surely not restrictive. Alternatively, from this time forward, the use of a network is also a possibility, e.g., infrared communications, wired/wireless LAN (Local Area Network), and Bluetooth™.

For reproduction of contents, if the contents are not encrypted, the contents are read from the information recording apparatus 300 or 310, and data about the contents is forwarded to the display section 150. If contents are stored after being encrypted, the contents are acquired together with key information corresponding to the position of the contents, and the contents are decoded using the key. At the same time as decoding of the contents, the decoding result, i.e., decoded content data, is forwarded to the output device.

The SAFIA applied in the "iVDR Secure" has the specifications for television recording, which define that a minute is the maximum length of time for change of the Usage Pass. The SAFIA also defines to read contents and any specific key information corresponding to the reproduction position of the contents, and to decode the contents using the key information. That is, the SAFIA defines to change the key information of Usage Pass on the basis of a plurality of ALUs. The ALUs here are the contents of reproduction video for less than a minute. Moreover, for reading the Usage Pass from the "iVDR Secure", the Usage Pass is encrypted before being exchanged between the information processor and the information recording apparatus. The concern here is that, if the CPU in use in the information recording apparatus and that in the information processor are both of a built-in type, encryption in the information recording apparatus and decoding in the information processor respectively take a long time. Accordingly, acquiring the key information on an as needed basis for the contents may cause a problem of not being in time for the actual reproduction processing.

Another concern here is that, in video contents, the amount thereof corresponding to the "predetermined time intervals" is constant in the long perspective of reproduction time, but video frames configuring the contents are of three data types, i.e., "I frame", "P frame", and "B frame", if with the currently popular video format such as MPEG. The I frame is considerably large in size compared with the P and B frames, and thus for reproducing the I frames, the amount of the contents for reading is increased a lot. The I frame is also not fixed in size. As such, with the "iVDR Secure", the number of the I frames encrypted by one Usage Pass cannot be specified.

In consideration of such restrictions, data for use in special reproduction is provided separately from data of the contents. The data for use in special reproduction includes the special reproduction data 740, the content/special reproduction data information 750, and the special reproduction data/key information 760, which are all handled similarly to any normal content data, e.g., encrypted and stored, unless being correlated to any corresponding contents. Such special reproduction data may be the result of extracting only I frames from MPEG2 data, for example. For storage into the "iVDR Secure", this special reproduction data is also stored in accordance with the SAFIA specifications. The reproduction time of this data is shorter than that of any normal contents if it is input into the decoder as it is, and this means that the encryption key remains effective several times longer than with the position of the contents during normal reproduction. Accordingly, even with some delay to acquire the key information, using the separately-provided special reproduction data enables display-target data to be provided whenever needed so that special reproduction can be performed with no problem.

Described now is a case where such special reproduction data is provided for use with an "iVDR Secure". This process is applicable when, in an information recording apparatus provided with the copyright protection function, key information is changed for a plurality of times for a piece of content, and when it takes time to acquire the key information.

Figure 2:
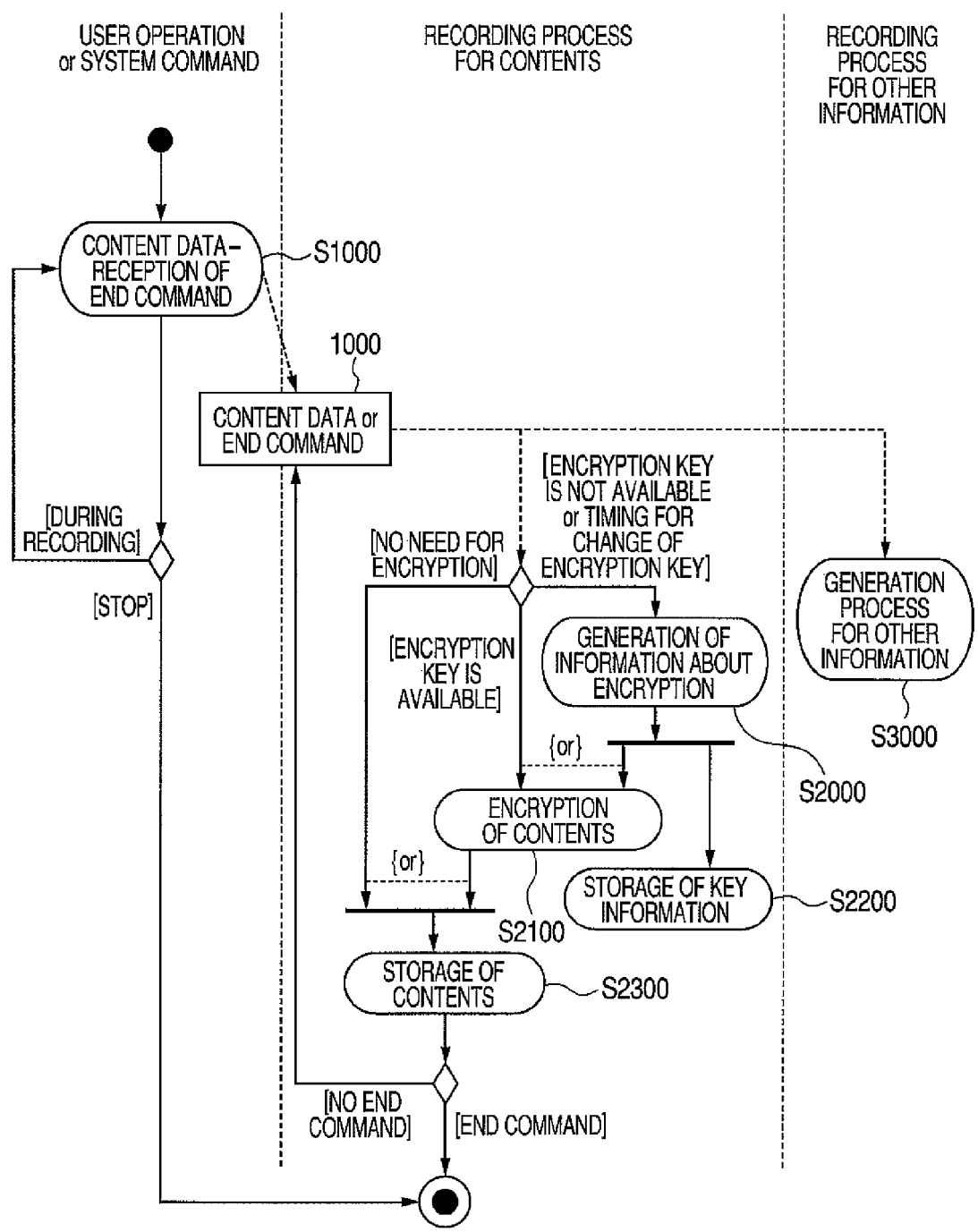
FIG. 2 shows the outline 1 of a recording process in the embodiment of the invention.
Figure 3:
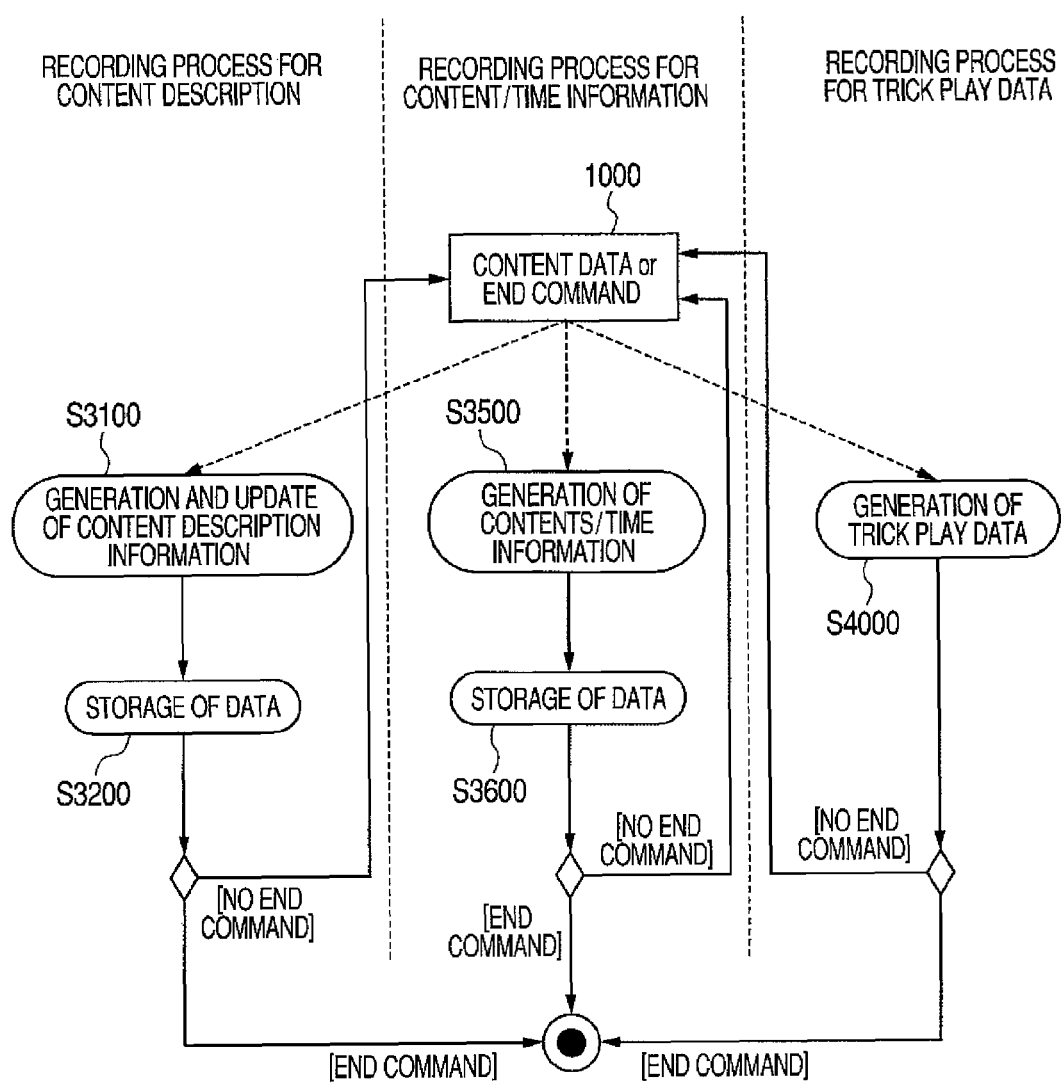
FIG. 3 shows the outline 2 of the recording process in the embodiment of the invention.
Figure 4:
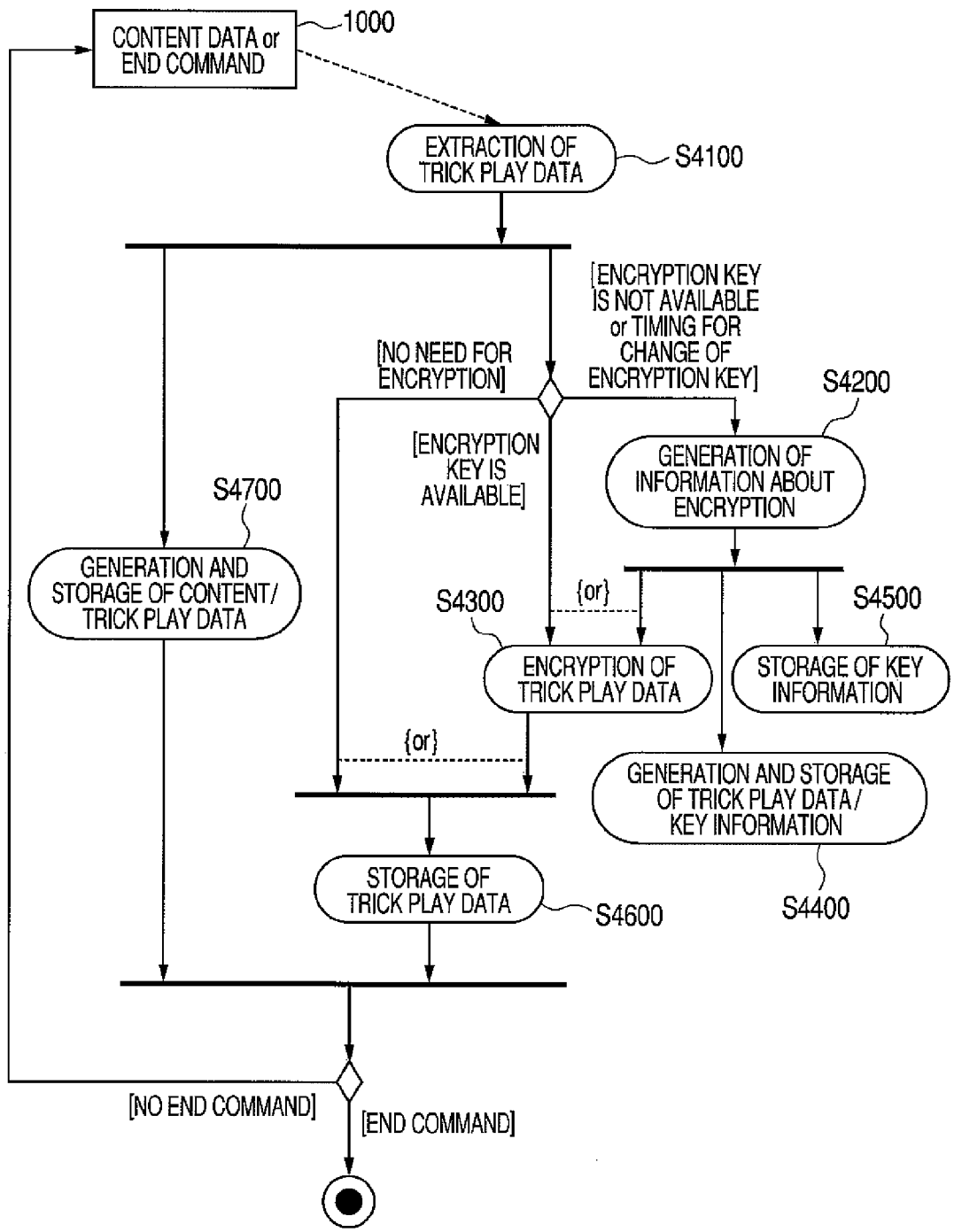
FIG. 4 shows the outline 3 of the recording process in the embodiment of the invention.

FIGS. 2, 3, and 4 each show a process during recording with the case as above. In accordance with the processes in the drawings, contents and special reproduction data are each encrypted before storage into an "iVDR Secure". By referring to FIG. 2, mainly described is a content encryption process.

First of all, in response to a user operation made through a remote controller or when a time programmed for recording comes, the system starts the recording process. After the recording process is started, until the end of the recording due to a user request of recording stop or the lapse of any predetermined length of time, a recording information processing section keeps receiving content data for recording. When the process is stopped, the recording information processing section receives a recording-stop request, and makes a notification (step S1000). After content data 1000 is received, contents are subjected to an encryption process. Alternatively, when no encryption is required for the contents, e.g., copy-free contents, the received contents may be stored as they are in an "iVDR Secure" (step S2300). Contents for digital terrestrial broadcast or others are generally required to be subjected to the encryption process, and thus are recorded after being encrypted. In this case, when there is already any key information needed for encryption, the key is used for encrypting the contents (step S2100), and the resulting encrypted contents are recorded (step S2300). On the other hand, when there is no such encryption key, or at the timing to update a key, the key information generation section 560 newly generates key information needed for encryption (step S2000), and using the resulting information, the contents are encrypted (step S2100). After completion of such encryption, the content data recording processing section 570 performs recording with respect to the information recording apparatuses 300 and 310 (step S2300). When the key information for encryption is updated, the information is recorded in the "iVDR Secure" (step S2200), and the key information is extracted for use during reproduction of the contents. With such a series of operation, the contents can be recorded while the key information for encryption being updated on the basis of a predetermined length of time.

During recording of the contents, any needed information is generated and recorded while the contents are being recorded (step S3000). By referring to FIG. 3, a description is given thereabout. In response to an input of the content data 1000, any data needed for special reproduction is generated and recorded together with the content description information 720 and the content/time information 730 (steps S3100, S3200, S3500, S3600, and S4000). Herein, with the SAFIA specifications, the content description information 720 corresponds to Program Info, and the content/time information 730 corresponds to Access Unit Info or Alloc Unit Info.

FIG. 4 shows a generation process of the special reproduction data. Note that the procedure of FIG. 4 is the one showing step S400 in detail. An input of content data is received, and data for special reproduction use is extracted (step S4100). When the content data is MPEG2 data, information about I frames corresponds thereto, for example. If there is any other data needed for special reproduction, information thereabout is acquired. When there is no need to encrypt the content data, this special reproduction data may be recorded without being encrypted (step S4600). With contents for broadcast, data thereabout is often stored after being encrypted, and similarly to the contents, such data may be encrypted using an encryption key if any (step S4300), and the resulting data is stored (step S4600). When there is no such encryption key, or at the timing for a change, key information needed for encryption is generated (step S4200), and using the resulting information, the data is encrypted and recorded (steps S4300 and S4600). The key information generated as such for encryption is then stored in the tamper-resistant area of the "iVDR Secure" (step S4500), and information about the correlation between the resulting encryption key information and the special reproduction data, i.e., the special reproduction data/key information 760, is generated for recording (step S4400).

At the same time as generating the special reproduction data, the content/special reproduction data information 750 is generated for recording (step S4700). For the actual special reproduction, the resulting content/special reproduction data information 750 is used for acquiring the correlation between the reproduction position of the contents and the special reproduction data, thereby performing data provision to a decoder.

Figure 5:
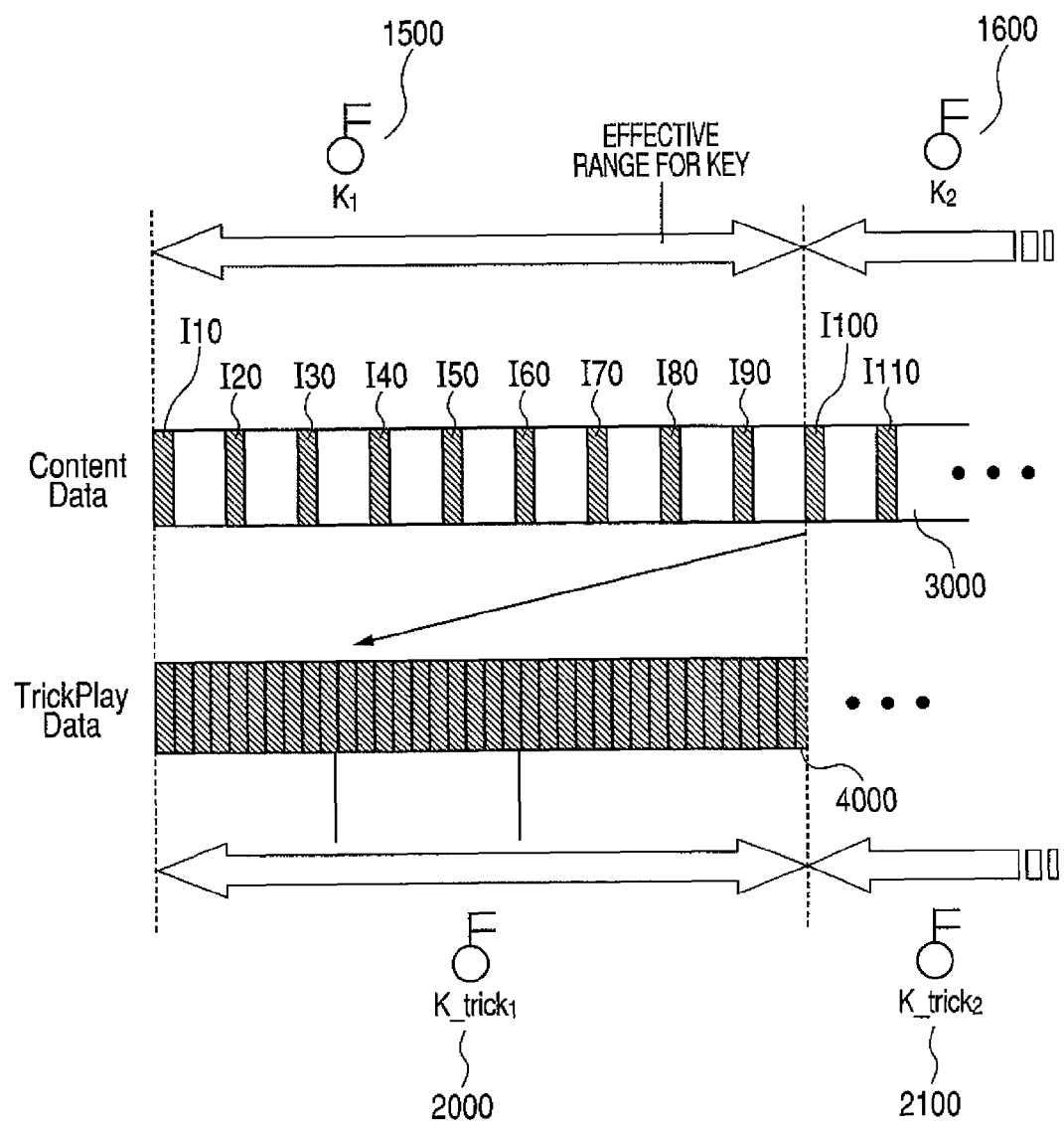
FIG. 5 is a diagram showing key information corresponding to content data and that to special reproduction data in the embodiment of the invention.

Described now is about the data for special reproduction use being able to implement the density several times higher with respect to the contents. The data for special reproduction use varies in display speed depending on the capabilities of the decoder. Assuming that the decoder has the capability of f (frame/sec), the time needed to display a piece of I frame will be 1/f (sec). In a target MPEG2 stream, if insertion of an I frame is performed on a Di (sec) basis, at the time of special reproduction, displaying a piece of I frame for seconds of Di will enable deriving of the display speed of the value similar to that during normal reproduction. Note here that, the data cannot be displayed in motion because such display is with only I frames. Accordingly, the display time for a piece of I frame will be 1/(Di×f) compared with that during normal reproduction. Note here that the decoder never fails to satisfy 1/f<Di. If the decoder cannot satisfy the expression, it means that normal reproduction cannot be performed. By separately generating data specifically for use with special reproduction, i.e., Trick Play Data, in spite of meeting the SAFIA specifications, one encryption key can handle Di×f-times of data compared with the reproduction time with normal reproduction. By referring to FIG. 5, a description is given thereabout. Content data 3000 provided to a recording apparatus by broadcast or others stores therein information about various I frames of I10, I20, ..., I110, and others. To meet the SAFIA specifications, an encryption key has to be changed in less than a minute. In FIG. 5, the contents are encrypted using an encryption key $K_1$ 1500 for the first encryption-key-corresponding segment, and using an encryption key $K_2$ 1600 for the next encryption-key-corresponding segment. The resulting contents are then stored in an "iVDR Secure". At this time, only information about the I frames such as I10 is extracted, and special reproduction data 4000 is generated at the same time. As described above, the time needed to display a piece of I frame is i/(Di×f) (sec). Accordingly, as shown in FIG. 5, compared with normal reproduction, one encryption key, i.e., encryption key $K\_trick_1$ 2000 for use with the special reproduction data, becomes able to handle a wider range of time.

As described above, by separately providing data for special reproduction use, one encryption key can handle a wider range of time compared with during normal reproduction. It means that the more special reproduction data can be acquired with a small number of encryption keys compared with the content data.

Figure 6:
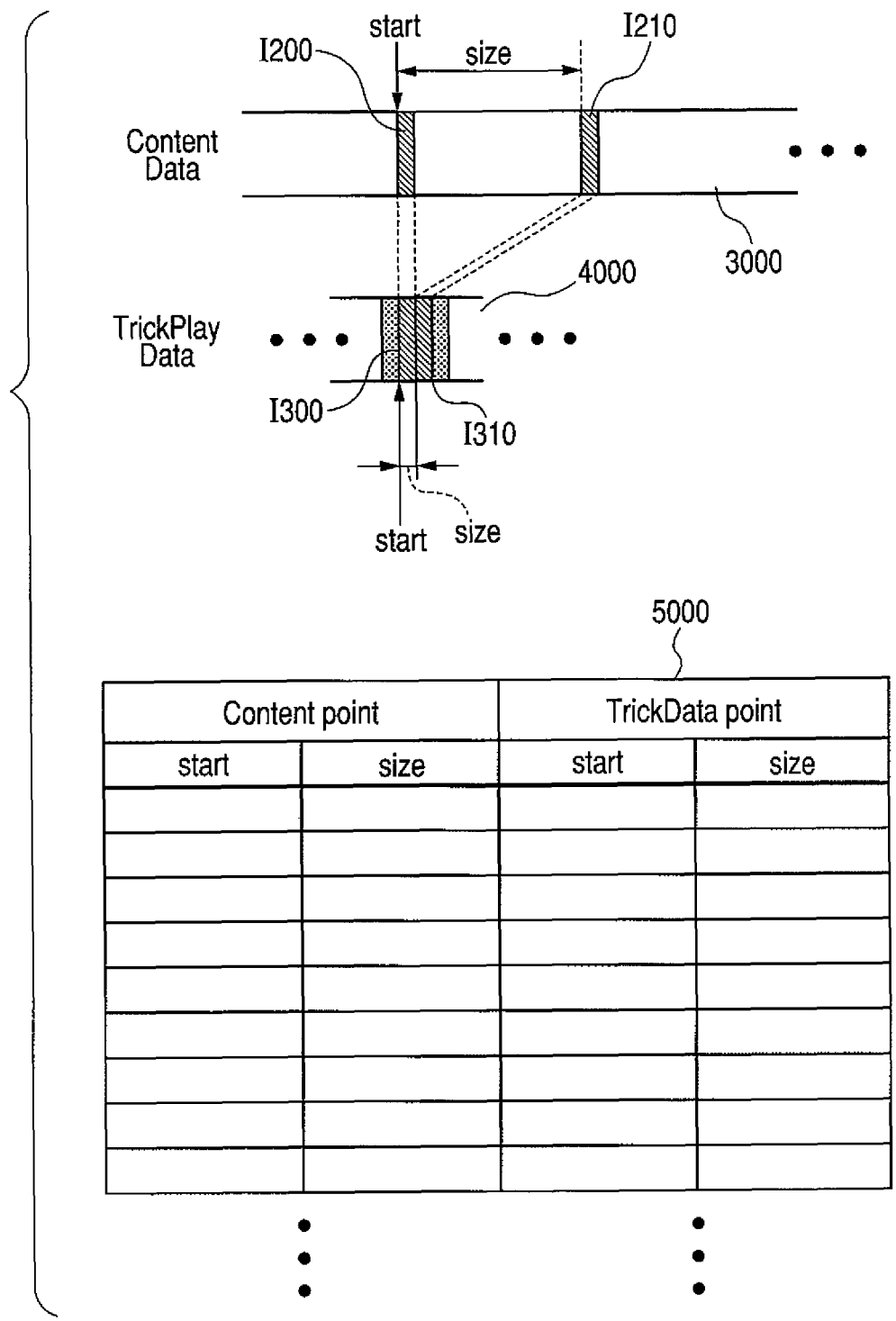
FIG. 6 is a diagram showing the correlation between the content data and the special reproduction data in the embodiment of the invention.

For reproduction of data, there are needs to read the data after the special reproduction data being specified by position to correspond to the position of the content data. Such a correlation is represented by the content data/special reproduction data information 750, which is generated in step S4700 during the recording process. FIG. 6 shows in detail the content data/special reproduction information 750 to be generated in step S4700 as such. A table 5000 shows in detail the content data/special reproduction information 750, and carries therein various types of information with a correlation thereamong. That is, information about the start position of each I frame in the content data is correlated with information about the length of time till the start position of the next I frame, and information about the start position of each I frame in the special reproduction data is correlated with information about the size of the I frame. The upper portion of FIG. 6 shows the conceptual illustration of this table. In the content data 3000, I frames I200 and I210 are respectively corresponding to I frames I300 and I310 in the special reproduction data 4000, and the I frames I200 and I300, and the I frames I210 and I310 are respectively the same data with only a difference of storage position. In the drawing, the position information about the I frame I200 from the front end of the content corresponds to an element of "start" under "Content Point" in the table 5000, and to an element of "size" thereunder, the length of time from the front end of the I frame I200 to the front end of the I frame I210 corresponds. Moreover, the position information about the special reproduction data from the front end thereof to the I frame I300 corresponds to an element of "start" under "TrickData Point" in the table 5000, and to an element of "size" thereunder, the size of the I frame I300 corresponds. By recording the positional correlation between the information about the I frames in the content data and the special reproduction data as such, any corresponding special reproduction data can be acquired during reproduction in a swift manner. In this embodiment, as shown in FIG. 6, the table is exemplified as including the elements for indicating the start position of each I frame in the content data, the length of time till the next I frame, the start position of each I frame in the special reproduction data, and the size of the I frame. These elements are surely not the only options, and the table may include elements for indicating the start position of each I frame, and the end position thereof, or elements for indicating information about the I frames of the content data, i.e., the start position of each I frame and the size thereof, or the end position of each I frame. As such, data to be stored in the table is not restrictive as long as it can assist to establish a correlation of position information in each of the data. The use of the information is determined by what process is to be executed during special reproduction. That is, the table 5000 of FIG. 6, i.e., the content data/special reproduction information 750, is assumed to have a detailed structure of being able to retain a sufficient amount of information needed during special reproduction.

With such processing, the special reproduction data can be generated at the same time as the content data during recording. With the SAFIA specifications, for example, the resulting special reproduction data may be stored as Named Stream related to the content data, or as a different content. Herein, used may be any mechanism with which the correlation among the contents can be immediately acquired using a file name or any other information, e.g., with a content file name of "PROG1234.AVS", used may be a file name such as "TRIC1234.AVS". For storing the special reproduction data as a different content, keeping the file configuration defined by the SAFIA specifications, the data can be stored in an "iVDR Secure" in the format similar to that for the normal contents.

Described now is a case of reproducing contents with the special reproduction data having been generated, and the reason why the time for key acquisition causes no problem during special reproduction.

Figure 7:
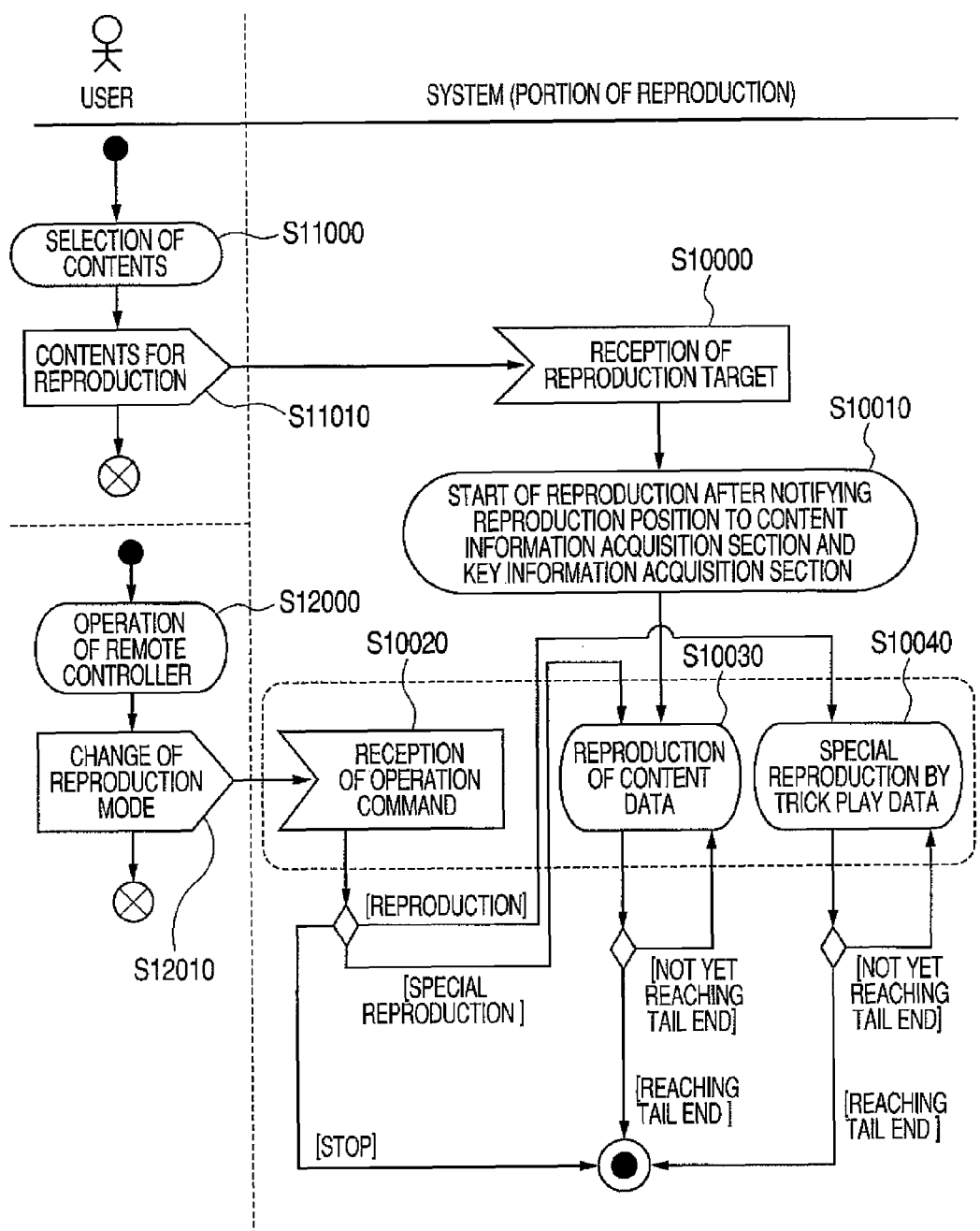
FIG. 7 shows the outline of a reproduction process in the embodiment of the invention.

FIG. 7 shows an activity diagram of the procedure of a reproduction process. First of all, a user operates a remote controller or others, thereby specifying a content he or she wants to view (step S11000). After the user specifies any content for reproduction as such, information thereabout is notified to the operation processing section 500 of the system (step S11010). After receiving the notification (step S10000), the operation processing section 500 starts processing in the information processor 100, and becomes ready for reproduction of the content. When the target content has been encrypted, an encryption key is required for decoding of the content at the time of viewing. Therefore, the content data acquisition processing section 510 is notified of the reading position of the content, and at the same time, a command is issued to the key information acquisition section 540 to acquire information about the encryption key corresponding to the reading position (step S10010). Thereafter, on the system side, the reproduction process is continued unless a user request comes (step S10030). At the same time, on the system side, the user operation remains accepted (step S10020). During the reproduction process, there may be a case where a user command of reproduction process change comes before the process reaches the tail end of the reproduction-target content, i.e., when a user command comes through operation of a remote controller or others for fast forward, fast rewind, stop, and others (step S12000). If this is the case, a command is issued to the side of the system to change the reproduction process in accordance with any requested details (step S12010). That is, to the system, a command is issued to perform any of "normal reproduction (step S10030)", "special reproduction using the special reproduction data (step S10040)", or stop the process. In response to such a change request, the system changes its own state to perform the process as requested. Note here that the special reproduction data is not always needed for special reproduction, e.g., pause, slow motion, frame-by-frame advance, and fast forward and fast rewind with a reproduction speed slower than a predetermined speed. In this embodiment, such processing is regarded as normal reproduction, and the special reproduction includes fast forward with a reproduction speed faster than a predetermined speed, and fast rewind with a reproduction speed faster than a predetermined speed in a rewinding direction.

As such, the state change from normal reproduction to special reproduction, or from special reproduction to normal reproduction is performed in response to a user command. Also during special reproduction, when the process reaches the tail end of the content, the process is ended without waiting for a user command (step S10040).

Described now is special reproduction using the special reproduction data generated during recording. When data can be simply displayed in the time of 1/n in normal reproduction, it means that the data can be fast-forwarded and fast-rewound at an nX-speed. In the real world, however, due to video data being large in amount, acquiring data of 1/n in real time from the reproduction-target data is difficult. Due to such circumstances, if with MPEG data, special reproduction is performed using only information about the I frames, and displaying the I frames each only for a unit time. The concern here is that, when an encryption key is to be changed at predetermined time intervals, acquiring and decoding the encryption key may take time, thereby resulting in a difficulty in displaying the I frames at such time intervals implementing special reproduction. In this embodiment, the special reproduction data is thus provided separately.

Figure 8:
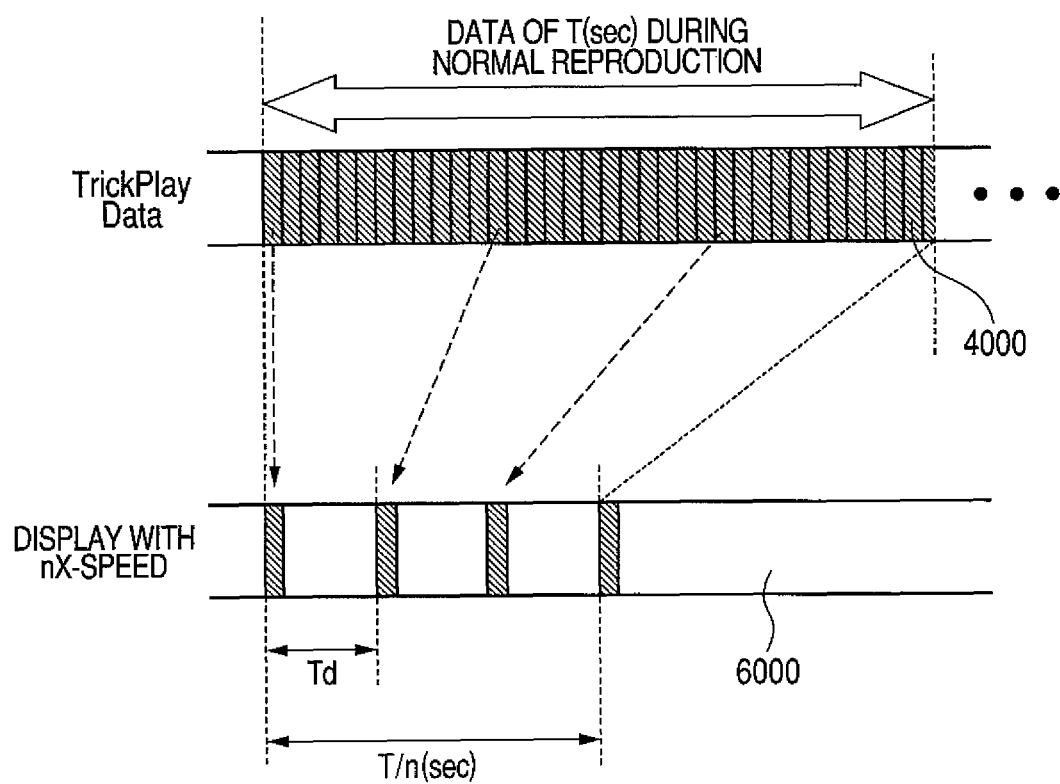
FIG. 8 shows an nX-speed display method in the embodiment of the invention.

To be specific, when a frame insertion interval is Di (sec) for each of the I frames in a certain video content, for special reproduction at an nX-speed, an I frame may be displayed for the duration of 1/(n×Di) (sec). In the real world, however, the speed for decoding each of the I frames varies depending on the decoder in use. If the decoder in use has the processing capability of being able to decode f pieces of the I frames in a second, the minimum value of the display interval for the I frames will be 1/f(sec). Accordingly, during special reproduction at the nX-speed, when the expression of $$1/(n \times Di) < 1/F$$

is established, the display interval for the I frames is set to be 1/f(sec), and for use with special reproduction, any of the I frames are selected for display from the special reproduction data not to exceed the f pieces in a second. FIG. 8 shows special reproduction implemented as such. On the other hand, when the expression above is not established, the display interval for the I frames is set to be 1/(n×Di) (sec), and all of the I frames are to be displayed.

Another concern here is the need to acquire key information for decoding use because the special reproduction data herein is also stored after being encrypted. Therefore, the issue in the invention as "the process is not completed right due to the long time needed to acquire and decode key information" is observed also when the special reproduction data is acquired. However, as in this embodiment, by generating and storing the special reproduction data separately from the content data, the resulting special reproduction data can be encrypted by the unit of a minute or longer, which is the limited length of time with the SAFIA specifications considering the time for normal reproduction. Herein, the special reproduction data can be reproduced in less than a minute, and this thus is within the SAFIA specifications. As such, by acquiring and decoding in advance key information corresponding to the special reproduction data, and by using the resulting information as "buffer, even if reading of an encryption key for next use or decoding thereof takes a long time, special reproduction can be completed right. At the start of reproduction, the first video appears with some delay at least until an encryption key for the contents is acquired and decoded (and until the content data is acquired, and until the start position is confirmed for reproduction). This is because, at the start of reproduction, the encryption key for the contents and the encryption key for special reproduction use are not both provided yet. However, after reproduction is started, the encryption key for special reproduction use may be acquired in advance as long as it does not disturb reproduction of the contents, thereby being able to provide a smooth mode change in response to the user operation.

As such, for a state change from normal reproduction to special reproduction, while the content data being reproduced in normal reproduction, key information that will be required for next special reproduction is acquired in advance, and another key information is acquired in advance for the next use during the special reproduction, thereby being able to provide a smooth state change from normal reproduction to special reproduction. Displaying a plurality of I frames during special reproduction can lead to smooth display thereof. The concern here, however, is the state change from special reproduction to normal reproduction. This is because the timing of specifying an encryption key needed for normal reproduction is "when a user command comes for a change to normal reproduction", but there is no clue when the user wants the change from special reproduction to normal reproduction. If any encryption key needed for normal reproduction is acquired at this timing, the process takes time, and the user may thus feel as the system having "poor response". In consideration thereof, described below is a way to reduce the user complaints.

Figure 9:
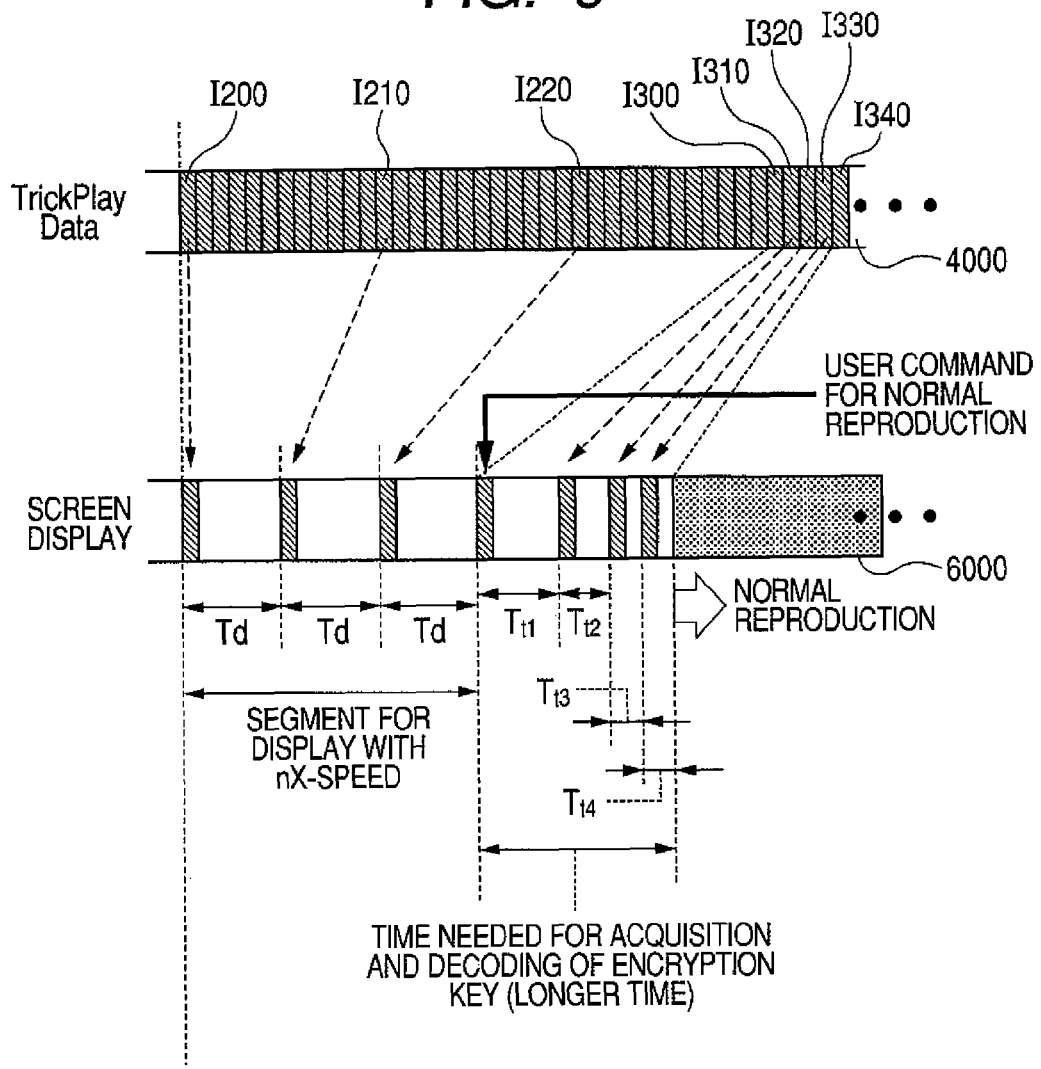
FIG. 9 shows a first screen display method at the time of speed change in the embodiment of the invention.

FIG. 9 shows a process for a state change from special reproduction to normal reproduction. As shown in the drawing, exemplified is a case where the special reproduction is being in progress at the nX-speed in the forward direction. In this example, the display interval for each of the I frames is Td, and information about each of the I frames is selected from the special reproduction data in accordance with the reproduction speed (selected I frames are I200, I210, and I220) Assumed here is that a normal reproduction command comes through user operation when the I frame I300 is being displayed. In this case, the position of the content corresponding to the I frame I300 is acquired from the content/special reproduction data information 750, and the content information is acquired from the position. At the same time, key information corresponding to the position is acquired and decoded. If the resulting data is ready for provision, it means that normal reproduction can be started. However, in the real world, acquiring the key information takes a long time. In consideration thereof, after displaying the I frame I300, any other of the I frames will be displayed extra for a duration longer than the time needed to acquire and decode the key information. Herein, the I frames to be displayed extra as such will be a plurality of those starting from the one immediately adjacent to the I frame I300. Moreover, after the command comes for a state change to normal reproduction, the display interval for the I frames is reduced by degrees from the initial value, i.e., Td (sec) in this example. In FIG. 9 example, the number of the I frames to be displayed at the time of the state change to normal reproduction is three not including the I frame I300, and their display intervals are respectively $T_{t1}$, $T_{t2}$, $T_{t3}$, and $T_{t4}$, which are so set as to satisfy the following expression:

$$Td > T_{t1} > T_{t2} > T_{t3} > T_{t4} (\geq 1/f)$$

Thereafter, normal reproduction is started from the front end position of the I frame I340, which is adjacent to the I frame I330 displayed last. By selecting the display intervals and any of the I frames for display at the time of a reproduction speed change as such, for the user's eyes, the display interval for the video looks like becoming short by degrees but the change of the video looks like becoming slow at a state change from special reproduction to normal reproduction. That is, it can give the user the impression that, visually, the video display is in an attempt to catch up with the change of the reproduction speed. By changing the display interval for the video through provision of data to a decoder as such, the user may easily perceive the speed change in comparison with the previous manner of providing no video change until the video is actually displayed, and this may be accepted easily by the user without causing annoyance thereto. What is good about this manner is that, in this example, it can buy the time of $T_{t1}+T_{t2}+T_{t3}+T_{t4}$ (sec) before the state change from special reproduction to normal reproduction. When the time gained as such is longer than the time needed to acquire the key information, it means that the speed change can be made without causing the user to notice any delay that occurs during acquisition of the encryption key.

Figure 10:
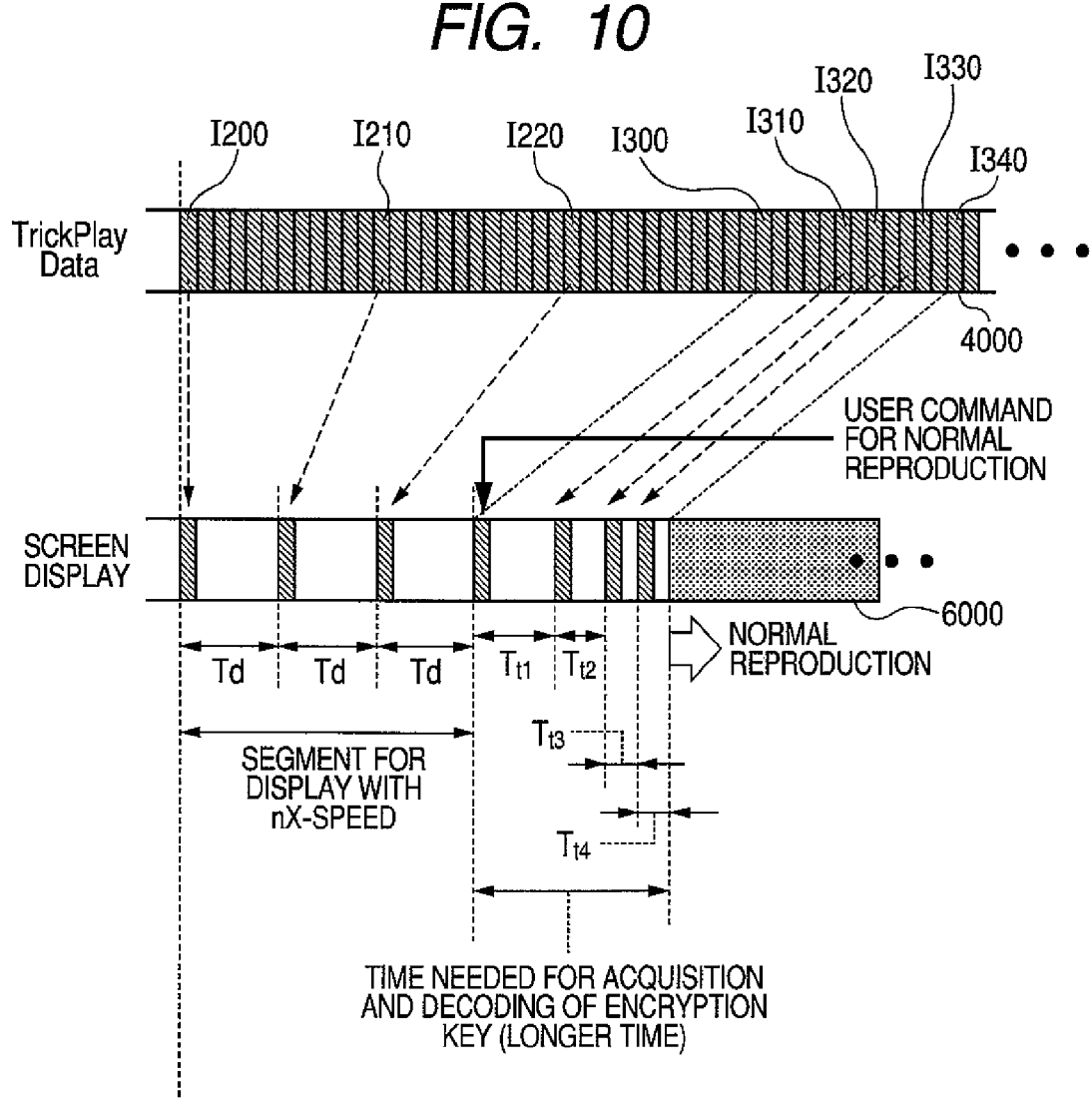
FIG. 10 shows a second screen display method at the time of speed change in the embodiment of the invention.

The concern here is a case where the insertion interval for the I frames is Di (sec) in the original content. In this case, when the display interval for a plurality of I frames at the time of speed change is smaller in value than the interval of Di (sec), visually, the video is displayed in slow motion during period of the speed change but after normal reproduction is started, the reproduction speed is put back to the normal value for display. In this case, in spite of the fact that the user issues a command of speed change as "normal reproduction", the reproduction speed is put back to the value for the normal reproduction after being reduced once to the speed of "slow motion". This operation looks weird for the user. In order to solve such a problem, if with a reproduction speed slower than the value of Di, the I frames to be selected for display during the speed change may not be those immediately adjacent to the I frame currently on display but may be those located away therefrom each by some frames. FIG. 10 shows such a display. To be specific, for displaying n pieces of I frames during the period of speed change, when Tk<Di is satisfied at the k-th frame, the next (k+1)-th frame will be the one located away from the k-th frame by $n_j$ pieces of I frames, which is expressed by the following expression:

$$n_j \geq (Di/Tk) - 1$$

When such an expression is established for the later selection of the I frames, the phenomenon that the video looks like "slow motion" when looked from the user does not occur. Note here that, for selecting the I frames as such at a speed change, selecting the I frames in accordance with the intervals of $T_{t1}$, $T_{t2}$, $T_{t3}$, $T_{t4}$, and others can lead to display causing no annoyance to the user. In FIG. 10 example, the I frames are so selected that four frames are skipped between the I frames I300 and I310, two frames are skipped between the I frames I310 and I320, and one frame is skipped between the I frames I320 and I330, and between the I frames I330 and I340.

Figure 11:
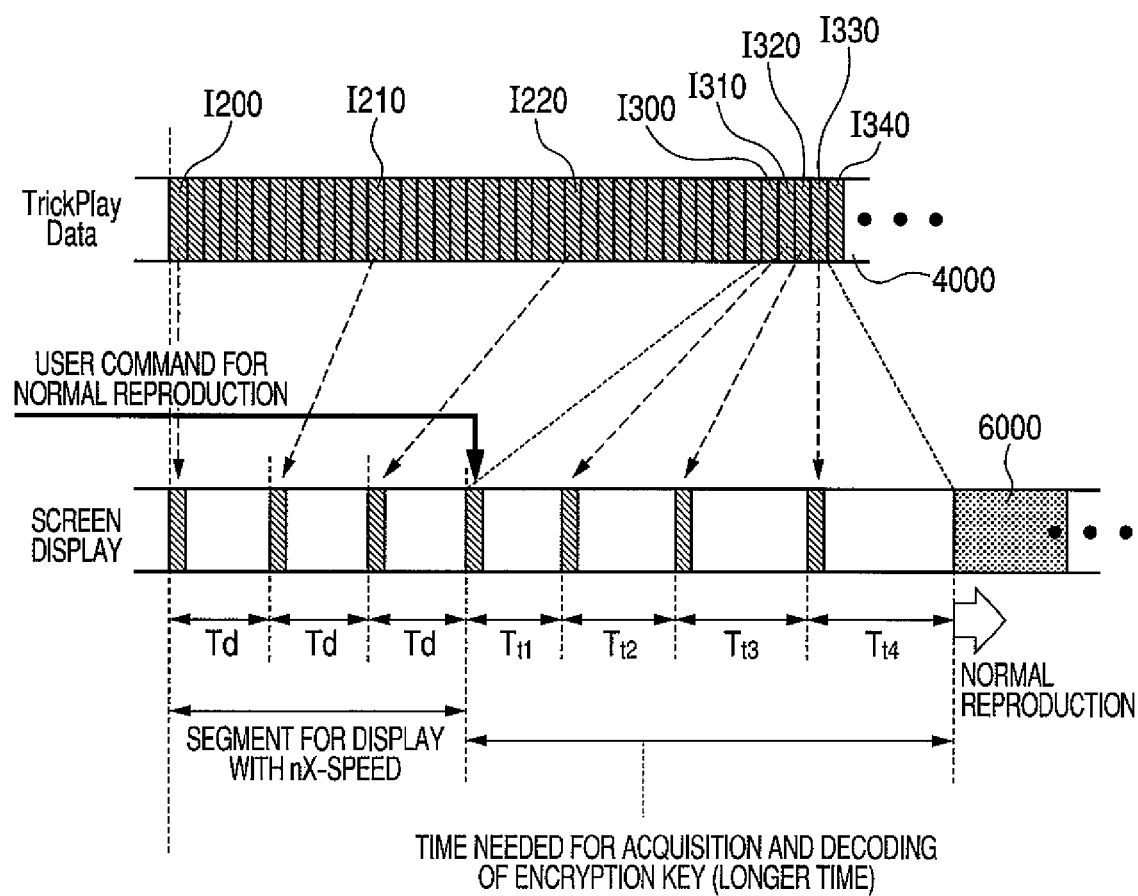
FIG. 11 shows a third screen display method at the time of speed change in the embodiment of the invention.
Figure 12:
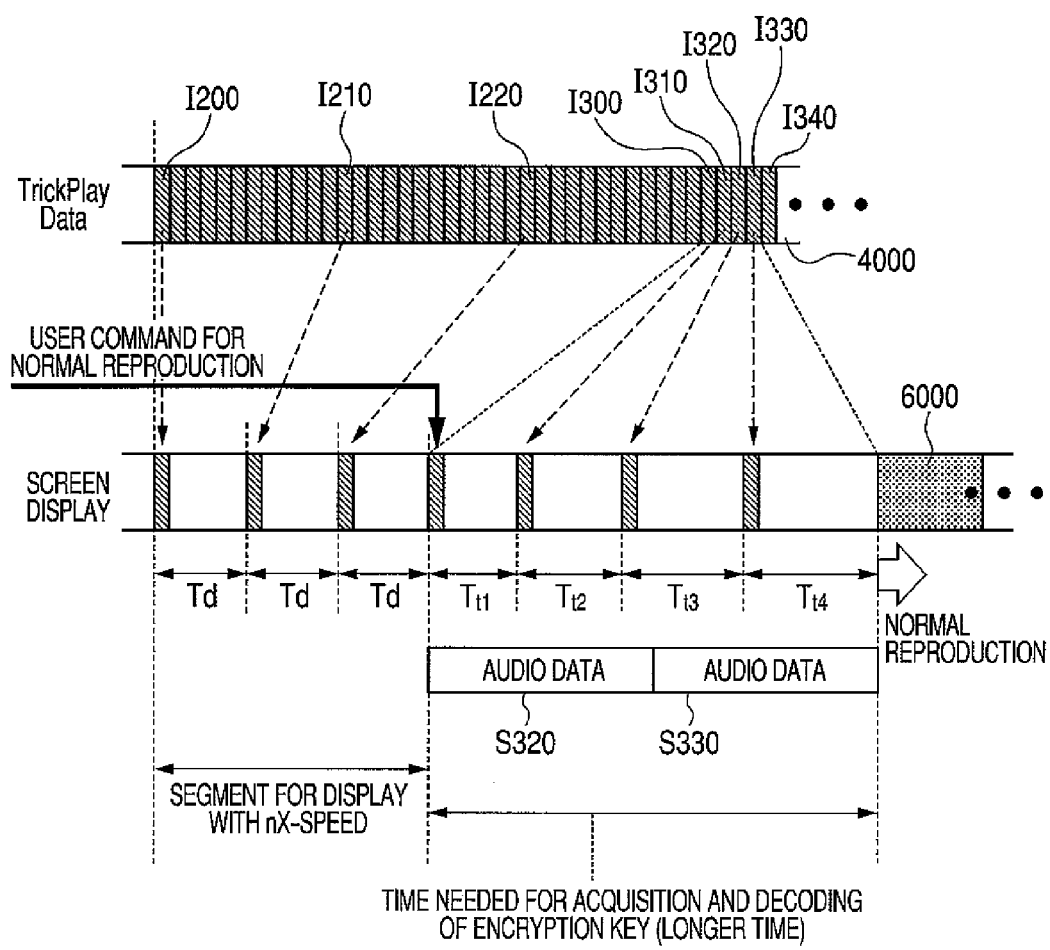
FIG. 12 shows a method for screen display and audio provision at the time of speed change in the embodiment of the invention.

FIGS. 9 and 10 each show the conceptual illustration of display when the value of Td (sec) is large. The value of Td can actually be 1/f (sec) at the minimum. When Td is of such a minimum value, e.g., $T_{t1}$, setting of any value smaller than Td is not possible in terms of the hardware. Also when Td is of such a minimum value, the video will be displayed at very short intervals, and for the user, the video thus looks like changing very rapidly. The user therefore feels the impression that the video is flickering. If this is the case, instead of reducing the time interval as described above, the value of $T_{t1}$ or others may be increased by degrees. FIG. 11 shows the conceptual illustration of such a value increase. At the time of such a value increase, the following expression is satisfied.

$$Td(=1/f) < T_{t1} < T_{t2} < T_{t3} < T_{t4} (\leq Di)$$

Such a change of display speed makes slow both the display speed of the video and the frequency of change of the video. This also can give the user the impression that the video display is in an attempt to catch up with the speed change. The time needed to acquire and decode an encryption key for normal reproduction use is the same as that in FIG. 9 example. FIGS. 9, 10, and 11 examples all give the user the same effects and impression but with different representation due to varying relative time scale. Note that, also in FIG. 11 example, when the display interval exceeds the value of Di (sec) during the period of speed change, the resulting display will make the user feel something is wrong. In consideration thereof, alternatively, for extending the display interval, instead of starting the process from the I frame immediately adjacent to the I frame currently in progress of being displayed when a command comes, like in FIG. 10 example, normal reproduction may be started from the I frame away from the current I frame by some pieces. Still alternatively, the number of I frames to be selected and the display time thereof may be both adjusted not to exceed the value of Di.

As such, by referring to FIGS. 9, 10, and 11, described is the mechanism for not causing a user to notice the time needed to acquire and decode an encryption key during a state change to normal reproduction by changing the display interval for the I frames. Exemplified above is the case of performing reproduction in the forward direction, but special reproduction in the opposite direction can be also implemented similarly. In the above examples, the video display is originally devised to reduce the possible annoyance resulted from the waiting time, and audio may be additionally used therefor. To be specific, the special reproduction data to be generated during recording may be recorded not only for any of the I frames but also with audio data for the I frame following thereto. The resulting data is used for the state change from special reproduction to normal reproduction, and is output from the audio slightly before the start position for normal reproduction. FIG. 11 shows the conceptual illustration thereof. Audio data S320 and S330 are respectively corresponding to the I frames I320 and I330. Providing not only the video data but also the audio data as such indeed causes a mismatch between the video and audio during the state change, but the audio data will be available for use immediately after the reproduction command comes. As such, the state change can be performed with a lower degree of annoyance for the user. When providing the video data as such as described by referring to FIGS. 9, 10, and 11 is difficult, the video of the I frame may be limited to one for display, and the audio may be provided first. By providing only the audio first as such, the degree of annoyance can be favorably reduced for the user.

Note here that, for displaying any extra video data or providing any audio data, there are needs to separately make specific adjustments to make the resulting display acceptable to the user, e.g., the number of I frames for display, and the display interval during the period of change. There is also need to define the display interval which is the differences among the FIGS. 9, 10, and 11 examples so as to be acceptable to the user.

Second Embodiment

The video data display method and the audio data output method described above are both intended not to make a user notice the delay to be caused by acquiring and decoding encryption key information. These methods both indeed serve well to perform a reproduction speed change without causing the user to feel something is wrong, but there is no way of eliminating the delay to be caused by such a reproduction time change. In consideration thereof, described now is a method for causing no effect of the time needed to acquire an encryption key. With an "IVDR Secure", the processing delay is resulted from the process of acquiring an encryption key, and thus using the following method will enable immediate completion of a reproduction speed change.

FIG. 13 shows the mechanism for reducing the processing time needed to acquire an encryption key. As shown in FIG. 13, the content/key information 710 is exemplified as being a key K1000, and the special reproduction data/key information 750 is exemplified as being a key K2000. In this example, for a swift state change from special reproduction to normal reproduction, the key K2000 is correlated with the key K1000. As described above, one encryption key can be correlated with the special reproduction data being several times larger than the normal reproduction data in terms of reproduction time. Assuming that this multiple is n, the special reproduction key information can represent n pieces of data compared with the normal reproduction key information. In the strict sense, with the SAFIA, the data has to be stored by the unit of ALU, and thus some degree of variation will be observed depending on the amount of the special reproduction data. Exemplified in the description below is a case where, with such a possibility taken into consideration, encryption key data is generated in such a manner that the special reproduction encryption key has the one-to-n relationship with the normal reproduction encryption key.

As such, if there is any mechanism that can acquire n pieces of normal reproduction encryption key from this one special reproduction encryption key, the process can be changed swiftly at a state change from special reproduction to normal reproduction. That is, when the normal reproduction encryption key satisfies the following equation f where $Key_i$ is the i-th normal reproduction encryption key, and $Key_{T\alpha}$ is the $\alpha$-th special reproduction encryption key, the normal reproduction encryption key can be acquired from the special reproduction encryption key.

$$Key_i = f(Key_{T\alpha})$$

Needless to say but the calculation time above is required to be shorter than the time to be taken to acquire an encryption key. As an alternative to such an equation, a correlation table may be generated for calculation as long as the key information is finite in number. The equation for correlation establishment as such can be specified by type depending on which vendor or which set. Moreover, using the numerical values to be available for use only by each vendor, or using serial numbers each assigned to the set will enable the use thereof only in any specific set, or reduce the risk of the leakage of keys and the algorithm description, thereby favorably increasing the security level for encryption. If a correlation can be established between the encryption key K2000 for special reproduction use and the encryption key K1000 for normal reproduction use, an encryption key needed for normal reproduction can be acquired immediately from the display position for special reproduction and the content/special reproduction data information 750, thereby being able to provide the user with the system that can make a reproduction speed change with no delay. That is, by defining in advance a rule for generating an encryption key for use during recording, i.e., recording of contents, any possible inconvenience during reproduction, i.e., during the use of contents, can be successfully solved.

Note here that a state change from normal reproduction to special reproduction requires the time for separately acquiring an encryption key for use with the special reproduction data, but during normal reproduction, key information can be acquired in advance as long as it does not disturb reproduction of the contents. As such, the key information can be always available for use excluding immediately after the start of reproduction. The process can be thus executed with no delay without establishing such a correlation as acquiring the special reproduction encryption key from the normal reproduction encryption key. A correlation can be surely established in two ways to eliminate any possible processing delay.

Moreover, if the normal reproduction encryption key can be calculated from the special reproduction encryption key, special reproduction can be performed without using the special reproduction data 740. This is because a plurality of normal reproduction encryption keys can be acquired from one special reproduction encryption key, and thus the process requires only any data to be extracted from the content data 700 for special reproduction use, i.e., specifically information about the I frames. That is, in a general case, the special reproduction data is not generated, and thus such special reproduction data has to be acquired from the content data. For decoding of the data, however, the encryption key information has to be acquired plurally in some cases, and if this is the case, such a process of acquiring the encryption key information takes too long to be in time for special reproduction. To work around such a problem, the method is proposed as above to generate the special reproduction data separately. With some advanced idea, if the special reproduction encryption key can be correlated with the normal reproduction encryption key, it means that a plurality of keys can be acquired all at once, thereby enabling special reproduction to be performed using the content data as an alternative to the special reproduction data when it is not available. As such, the special reproduction can be performed with no delay even if there is no such information as the special reproduction data 740, the content/special reproduction data information 750, and the special reproduction data/key information 760. FIG. 14 shows an example thereof, and the procedure thereof is described below.

During recording of contents, the rule of generating an encryption key is determined as below.

1. If with a first key, or if with an (n+1)-th key (n=5 in FIG. 13 example), any numerical value having no relation such as random number is used as an encryption key.

2. Thereafter, a key generation function F is used to calculate the keys before the n-th key with an input of key information. For example, the key generation function can be expressed by the following equation, where $Key_i$ is the i-th normal reproduction encryption key, $KeyT_\alpha$ is the α-th special reproduction encryption key, and $[1/n]$ is an integer not exceeding n.

$$Key_i = f(KeyT_{[\frac{i}{n}]}, i)$$

With the key generation function F defined as such, a plurality of encryption keys can be acquired from one encryption key using the key generation function F also during reproduction. Exemplified herein is the case of changing the main encryption key at the intervals of n encryption keys, but this interval may be variable. Moreover, exemplified is the case of acquiring an encryption key (key not including the main encryption key) based on another encryption key preceding thereto, but alternatively, an encryption key may be generated and acquired using such information as "what number the key information has". Still alternatively, using any information unique to each apparatus such as serial number, settings can be made, e.g., an apparatus having been performed recording is allowed to generate a plurality of encryption keys from one encryption key, but the remaining apparatuses are not allowed as such, and may each acquire an encryption key from a storage medium. As such, any delay time to be caused by the time of acquiring an encryption key can be eliminated by a content key satisfying the requirements, i.e., an encryption key for a specific location is information for use to generate any other encryption key, and a specific generation rule is applicable to a specific segment (this segment can be variable). The algorithm related to such a generation rule and the size of the segment may vary, for example, and not everyone has to know those but only an operator may. Even if such a rule is not known, the rule may be used as any normal SAFIA contents with no problem.

By setting a rule of generating the content/key information 710 as such, the resulting system has almost no need to consider the time needed to acquire an encryption key during reproduction. In the above embodiment, the description is given based on the premise that the key is changed to the extent required by the specifications, but this is surely not restrictive. Alternatively, when the security is ensured by any other method, e.g., acquiring information is made generally difficult using a serial number unique to the apparatus, any same encryption key may be used, or any same encryption key may be used for a specific segment. That is, as long as the required security level can be satisfied, any one specific encryption key may be continuously used.

Third Embodiment

The SAFIA specifications describe as "key information is set with respect to any successive content data", and this is thus impossible to implement. However, in a system implementing not the SAFIA but "the content protection function provided with a mechanism of changing an encryption key in accordance with a time or an amount of data", executing such an encryption process as shown in FIG. 15 can reduce the delay to be caused by the time needed to acquire and decode the key information. The method of FIG. 15 is described below. First of all, a content includes information about I frames for use during special reproduction, i.e., I400, I410, and others. The encryption unit for the content is not the successive area of the content but the "I frame" and "the remaining area". In FIG. 15, an encryption key Kn is provided for three areas enclosed by the I frames I400, I410, I420, and I430. Similarly, an encryption key Kn+1 is provided for three areas enclosed by the I frames I430, I440, I450, and I460, and the content is encrypted using this key.

The I frames I400, I410, I420, I430, I440, and I450 being characteristics information are stored after being encrypted by an encryption key of Ktric_n. Information about some I frames after the I frame I460 is encrypted by an encryption key of Ktric_n+1. Even if an encryption key is changed at specific intervals, the reproduction time only with the I frames varies, thereby being able to correlate a larger number of I frames to an encryption key compared with normal reproduction. As such, this enables special reproduction with respect to contents longer in time using one encryption key for use with the I frames.

By encrypting only any characteristic area in a content using a separately-provided encryption key as such, the need can be eliminated to keep the special reproduction data for process execution only by making ready separately in advance key information, and by increasing the amount of the content/key information.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. A reproduction apparatus, comprising at least one of a hardware processor and circuitry configured to effect:
    a data acquirer configured to acquire from a recording medium: encrypted motion data; special reproduction data useable for effecting a predetermined special reproduction regarding the motion data; and, correlation data providing a correlation between points of the motion data and points of the special reproduction data, respectively, wherein the special reproduction data is recorded separately from the motion data;
    a key information acquirer configured to acquire, from the recording medium, motion data key information corresponding to the motion data;
    a decoding processor device that decodes the encrypted motion data using the motion data key information;
    a reproducer that converts, for output, the motion data being a decoding result, into a video signal and an audio signal; and
    an operation inputter that accepts a user operation, wherein
    with a reproduction time set with an upper limit of a predetermined value for the motion data that can be decoded using a piece of the motion data key information,
    for special reproduction in changing a reproduction mode between a normal reproduction mode and a special reproduction mode,
        the data acquirer is configured to acquire, from the recording medium, the special reproduction data corresponding to the motion data in progress of being reproduced, by utilizing the correlation data providing the correlation between points of the motion data and points of the special reproduction data, and
        the reproducer is configured to convert, for output, the special reproduction data into a video signal.

2. The reproduction apparatus according to claim 1, wherein
    the special reproduction data is recorded on the recording medium after being encrypted,
    the key information acquirer is configured to acquire, from the recording medium, special reproduction data key information corresponding to the special reproduction data, and
    the decoding processor device is configured to decode the special reproduction data using the special reproduction data key information.

3. The reproduction apparatus according to claim 1, wherein
    the motion data includes an I frame, a P frame, and B frame, and
    the special reproduction data is a collection of the I frame and others included in the motion data.

4. The reproduction apparatus according to claim 3, wherein
    the special reproduction data is recorded on the recording medium after being encrypted,
    the key information acquirer is configured to acquire, from the recording medium, special reproduction data key information corresponding to the special reproduction data,
    the decoding processor device is configured to decode the special reproduction data using the special reproduction data key information, and
    the special reproduction data that can be decoded by a piece of the special reproduction data key information has a one-to-multiple relationship with the motion data that can be decoded by the piece of the motion data key information.

5. The reproduction apparatus according to claim 1, wherein
    the special reproduction is fast-forward reproduction or fast-rewind reproduction with a reproduction speed faster than that of normal reproduction, and
    the special reproduction is performed by reproducing an I frame of the special reproduction data.

6. The reproduction apparatus according to claim 2, wherein
    before the operation inputter accepts a special reproduction command,
        the key information acquirer is configured to acquire the special reproduction data key information about the special reproduction data corresponding to the motion data in progress of being reproduced.

7. The reproduction apparatus according to claim 1, wherein
    when the operation inputter accepts a normal reproduction command during the special reproduction,
        the data acquirer and the key information acquirer respectively, are configured to acquire the motion data located at a normal reproduction start position and the motion data key information corresponding to the motion data, and
        while the motion data at the normal reproduction start position and the motion data key information are being acquired, the reproducer is configured to output a video signal corresponding to the special reproduction data.

8. The reproduction apparatus according to claim 7, wherein
    until the normal reproduction is started after the normal reproduction command is accepted, the special reproduction data is reproduced at a reproduction speed slower than that of the special reproduction, but faster than that of the normal reproduction.

9. The reproduction apparatus according to claim 8, wherein
    the special reproduction data includes audio data that is to be reproduced together with the motion data, and until the normal reproduction is started again after the normal reproduction command is accepted, the audio data is to be reproduced.

10. A reproduction apparatus, comprising at least one of a hardware processor and circuit configured to effect:
   a data acquirer configured to acquire encrypted motion data from a recording medium;
   a key information acquirer configured to acquire, from the recording medium, motion data key information corresponding to the motion data;
   a decoding processor device configured to decode the encrypted motion data using the motion data key information; and
   a reproducer configured to convert, for output, the motion data being a decoding result, into a video signal and an audio signal, wherein
   with a reproduction time set with an upper limit of a predetermined value for the motion data that can be decoded using a piece of the motion data key information,
      the motion data includes: first motion data; second motion data partially including image data included in the first motion data for effecting a predetermined special reproduction regarding the first motion data; and, correlation data providing a correlation between points of the first motion data and points of the second motion data, respectively, wherein the second motion data is recorded separately from the first motion data, and
   in accordance with a reproduction speed of the motion data, the first or second motion data is selected for reproduction, wherein in changing a reproduction mode between a normal reproduction mode and a special reproduction mode, the second motion data corresponding to the first motion data in progress of being reproduced is selected, by utilizing the correlation data providing the correlation between points of the first motion data and points of the second motion data.

11. The reproduction apparatus according to claim 10, wherein
   when the reproduction speed on a request is faster than a predetermined speed, the second motion data is reproduced, and when the reproduction speed on a request is slower than the predetermined speed, the first motion data is reproduced.

12. A recording and reproduction apparatus, comprising at least one of a hardware processor and circuitry configured to effect:
   a receptor configured to receive motion data from outside;
   an encryption processor device configured to encrypt the received motion data;
   a data recording processor device configured to record the encrypted motion data onto a recording medium;
   a data acquirer configured to acquirer the encrypted motion data from the recording medium;
   a key information acquirer configured to acquire, from the recording medium, motion data key information corresponding to the motion data;
   a decoding processor device configured to decode the encrypted motion data using the motion data key information; and
   a reproducer configured to convert, for output, the motion data being a decoding result into a video signal and an audio signal, wherein
   the motion data is decoded, for reproduction, using the motion data key information, and
   with a reproduction time set with an upper limit of a predetermined value for the motion data that can be decoded using a piece of the motion data key information,
   for recording of the motion data,
      first motion data key information is generated,
      second motion data key information is generated using the first motion data key information, and information unique to the recording and reproducing apparatus,
         the first and second motion data key information is recorded onto the recording medium with a correlation with the motion data, and
   for reproduction of the motion data,
      the first motion data key information is acquired from the recording medium,
      the information unique to the recording and reproduction apparatus is acquired from the recording and reproduction apparatus,
      the second motion data key information is generated from the first motion data key information and the information unique to the recording and reproduction apparatus, and
   the motion data is decoded, for reproduction, using the first and second motion data key information.

13. The recording and reproduction apparatus according to claim 12, further comprising:
   a special reproducer configured to generate special reproduction data for use with special reproduction; and
   a special key reproducer configured to generate special reproduction key information for use with decoding of the special reproduction data, wherein
   for recording of the special reproduction data,
      the special reproduction data key information is generated using the first motion data key information and the information unique to the recording and reproduction apparatus, and
      the special reproduction data key information is recorded onto the recording medium with a correlation with the special reproduction data, and
   for reproduction of the special reproduction data,
      the first motion data key information is acquired from the recording medium,
      the information unique to the recording and reproduction apparatus is acquired from the recording and reproduction apparatus,
      the special reproduction data key information is generated from the first motion data key information and the information unique to the recording and reproduction apparatus, and
      the special reproduction data is decoded, for reproduction, using the special reproduction data key information.

14. A processor-implemented reproduction method effected at least in part via at least one of a hardware processor and circuitry, the method comprising:
   acquiring encrypted motion data from a recording medium; special reproduction data useable for effecting a predetermined special reproduction regarding the motion data; and, correlation data providing a correlation between points of the motion data and points of the special reproduction data, respectively, wherein the special reproduction data is recorded separately from the motion data;
   acquiring, from the recording medium, motion data key information corresponding to the motion data;
   decoding the encrypted motion data using the motion data key information; and converting, for output, the motion data being a decoding result, into a video signal and an audio signal, wherein with a reproduction time set with an upper limit of a predetermined value for the motion data that can be decoded using a piece of the motion data key information, for special reproduction in changing a reproduction mode between a normal reproduction mode and a special reproduction mode, the acquiring acquires, from the recording medium, the special reproduction data corresponding to the motion data in progress of being reproduced, by utilizing the correlation data providing the correlation between points of the motion data and points of the special reproduction data, and the converting converts, for output, the special reproduction data into a video signal.

15. A recording and reproduction apparatus, comprising at least one of a hardware processor and circuitry configured to effect:

a receptor configured to receive motion data from outside;

an encryption processor device configured to encrypt the received motion data;

a special reproducer configured to generate: special reproduction data useable for effecting a predetermined special reproduction regarding the motion data; and, correlation data providing a correlation between points of the motion data and points of the special reproduction data, respectively, a data recording processor device configured to record the encrypted motion data, the special reproduction data and the correlation data, onto a recording medium, wherein the special reproduction data is recorded separately from the motion data;

a data acquirer configured to acquire the encrypted motion data, the special reproduction data and the correlation data, from the recording medium;

a key information acquirer configured to acquire, from the recording medium, motion data key information corresponding to the motion data;

a decoding processor device configured to decode the encrypted motion data using the motion data key information; and a reproducer configured to convert, for output, the motion data being a decoding result into a video signal and an audio signal, wherein the motion data is decoded, for reproduction, using the motion data key information, and with a reproduction time set with an upper limit of a predetermined value for the motion data that can be decoded using a piece of the motion data key information, for recording of the motion data, first motion data key information is generated, second motion data key information is generated using the first motion data key information, and information unique to the recording and reproducing apparatus, the first and second motion data key information is recorded onto the recording medium with a correlation with the motion data, and for reproduction of the motion data, the first motion data key information is acquired from the recording medium, the information unique to the recording and reproduction apparatus is acquired from the recording and reproduction apparatus, the second motion data key information is generated from the first motion data key information and the information unique to the recording and reproduction apparatus, and the motion data is decoded, for reproduction, using the first and second motion data key information;

wherein at least one of the acquiring, the decoding and the converting, is implemented by the at least one of a hardware processor and circuitry.

16. The recording and reproduction apparatus according to claim 15, further comprising:

a special reproducer configured to generate special reproduction key information for use with decoding of the special reproduction data, wherein for recording of the special reproduction data, special reproduction data key information is generated using the first motion data key information and the information unique to the recording and reproduction apparatus, and the special reproduction data key information is recorded onto the recording medium with a correlation with the special reproduction data, and for reproduction of the special reproduction data in changing a reproduction mode between a normal reproduction mode and a special reproduction mode, the first motion data key information is acquired from the recording medium, the information unique to the recording and reproduction apparatus is acquired from the recording and reproduction apparatus, the special reproduction data key information is generated from the first motion data key information and the information unique to the recording and reproduction apparatus, the data acquirer is configured to acquire, from the recording medium, the special reproduction data corresponding to the motion data in progress of being reproduced, by utilizing the correlation data providing the correlation between points of the motion data and points of the special reproduction data, and the special reproduction data is decoded, for reproduction, using the special reproduction data key information.

\* \* \* \* \*